United States Patent
Matsumoto

(10) Patent No.: US 7,573,639 B2
(45) Date of Patent: Aug. 11, 2009

(54) TERAHERTZ-BAND OPTICAL FILTER, DESIGNING METHOD THEREOF, AND MANUFACTURING METHOD THEREOF

(75) Inventor: Naoki Matsumoto, Yasu (JP)

(73) Assignee: Murata Manufacturing Co., Ltd (JP)

( * ) Notice: Subject to any disclaimer, the term of this patent is extended or adjusted under 35 U.S.C. 154(b) by 0 days.

(21) Appl. No.: 12/146,717

(22) Filed: Jun. 26, 2008

(65) Prior Publication Data
US 2008/0252979 A1 Oct. 16, 2008

Related U.S. Application Data

(63) Continuation of application No. PCT/JP2006/319935, filed on Oct. 5, 2006.

(30) Foreign Application Priority Data

Dec. 28, 2005 (JP) ............... 2005-379548
May 31, 2006 (JP) ............... 2006-152711

(51) Int. Cl.
  *G02B 1/10* (2006.01)
(52) U.S. Cl. .............. 359/588; 359/582; 359/587; 359/589
(58) Field of Classification Search ........... 359/260, 359/582, 586, 587, 588, 589; 356/454
See application file for complete search history.

(56) References Cited

U.S. PATENT DOCUMENTS

| 4,854,670 | A | 8/1989 | Mellor | |
|---|---|---|---|---|
| 6,631,033 | B1 * | 10/2003 | Lewis | 359/584 |
| 2004/0075923 | A1 | 4/2004 | Knobloch et al. | |
| 2005/0018331 | A1 | 1/2005 | Pautet et al. | |
| 2005/0099691 | A1 * | 5/2005 | Hendrix et al. | 359/557 |

FOREIGN PATENT DOCUMENTS

JP  2004-109827  4/2004

OTHER PUBLICATIONS

PCT/JP2006/319935 International Search Report dated Dec. 19, 2006.
PCT/JP2006/319935 Written Opinion dated Dec. 19, 2006.
"Highly Tunable Photonic Crystal Filter for the Terahertz Range", Kuzel et al. Optics Letters, Mar. 1, 2005, vol. 30, No. 5.
"Optical Thin Film User's Handbook" Shigetaro Ogura, The Nikkan Kogyo Shimbun, 1991, pp. 138-142.

* cited by examiner

*Primary Examiner*—Alessandro Amari
(74) *Attorney, Agent, or Firm*—Dickstein, Shapiro, LLP.

(57) ABSTRACT

A terahertz band optical filter having a dielectric multilayer periodic structure in which a plurality of dielectric materials are periodically layered. Multi-cavity layers each having an optical path length of n times $\lambda/2$ (n is an integer greater than or equal to 1) and made of a low-refractive index medium are arranged. The cavity layers are coupled using a single-layer coupling layer having an optical path length $\lambda/4$ and made of a high-refractive index medium, thus forming a multi-cavity structure. Matching layers each including a high refractive index layer and a low refractive index layer each having an optical path length of $\lambda/4$ are disposed at either end of the multi-cavity structure.

6 Claims, 10 Drawing Sheets

(A)                                            (B)

TERAHERTZ-BAND OPTICAL FILTER, DESIGNING METHOD THEREOF, AND MANUFACTURING METHOD THEREOF

CROSS REFERENCE TO RELATED APPLICATIONS

The present application is a continuation of International Application No. PCT/JP2006/319935, filed Oct. 5, 2006, which claims priority to Japanese Patent Application No. JP2005-379548, filed Dec. 28, 2005, and Japanese Patent Application No. JP2006-152711, filed May 31, 2006, the entire contents of each of these applications being incorporated herein by reference in their entirety.

FIELD OF THE INVENTION

The present invention relates to a bandpass filter that allows electromagnetic waves in a desired frequency range in a terahertz band to pass therethrough and, in particular, a terahertz band optical filter having a dielectric multilayer periodic structure in which a plurality of dielectric materials are periodically layered, a method for designing the terahertz band optical filter, and a method for manufacturing the terahertz band optical filter.

BACKGROUND OF THE INVENTION

A multi-cavity filter has been known as an optical filter having a rectangular bandpass characteristic for allowing light in a desired frequency range to pass therethrough, as described in Non-Patent Document 1. A multi-cavity filter is formed by coupling a plurality of base units (Fabry-Perot etalons) each having a single resonator structure in an optical bandpass filter having a dielectric multilayer structure. In the dielectric multilayer structure, two or more types of dielectric materials having different dielectric constants are layered periodically. In this way, a bandpass characteristic can be obtained in only a particular bandwidth.

More specifically, as shown in FIG. 1, a cavity layer 61 having an optical path length that is a multiple integer of ½ of a given passband wavelength $\lambda_O$ (hereinafter simply referred to as a "$\lambda_O/2$") is sandwiched by reflecting layers 60 so as to form a unit block 20. The reflecting layer 60 includes alternately stacked layers 62 of a high refractive index medium (hereinafter referred to as "high refractive index layers") and having an optical path length of a ¼ wavelength (hereinafter simply referred to as a "$\lambda_O/4$") and layers 63 of a low refractive index medium (hereinafter referred to as "low refractive index layers") and having an optical path length of a ¼ wavelength. Two or more blocks 20 are stacked so as to be symmetrical with respect to each other. Thus, a multi-cavity structure is achieved.

The reflecting layers 60 used for sandwiching the cavity layer 61 are disposed so as to be symmetrical with respect to the cavity layer 61. Each of the reflecting layers 60 includes at least two low refractive index layers and two high refractive index layers.

A reference symbol (L) denotes a low refractive index layer having an optical path length of $\lambda_O/4$. A reference symbol (2L) denotes a low refractive index layer having an optical path length of $\lambda_O/2$. A reference symbol (H) denotes a high refractive index layer having an optical path length of $\lambda_O/4$.

A filter shown in FIG. 1 is a design example of a filter in which the number of unit blocks is 2, and the structure can be represented as $(LH)^2L^2(HL)^4(LH)^4L^2(HL)^2$. Note that $(LH)^n$ represents a layer of a pair of H and L is stacked n times. The representation can be rewritten as LHLH 2L HLHLHLH 2L HLHLHLH 2L HLHL.

The multi-cavity filter described in Non-Patent Document 1 has long been known as a filter for a range from visible light to infrared. Thus, a method for designing the structure of a filter that satisfies demanded characteristics has been established.

In general, the bandpass characteristic of this filter depends on the number of layers in the stacked reflecting layer 60, the thickness of the cavity layer 61, and the number of the unit blocks 20 that are coupled with each other. By controlling these factors, a filter having an optimum characteristic can be designed.

In Non-Patent Document 1, for the multilayer materials, well known Si (index of refraction=3.5) and $SiO_2$ (index of refraction=2.0) are used for a high refractive index layer (H) and a low refractive index layer (L), respectively. The refractive index ratio is 1.75. In this example, twenty-five layers are employed in total. In general, in order to obtain filter characteristics using a sufficient interference effect, more than or equal to twenty layers are employed for such a type of filter.

A multi-cavity filter having such a structure can provide a rectangular bandpass characteristic around a given central wavelength $\lambda_O$, as shown in FIG. 4.23 of Non-Patent Document 1.

On the other hand, a method for manufacturing a terahertz dielectric multilayer periodic structure is described in Patent Document 1 and Non-Patent Document 2.

Patent Document 1 describes a method in which a multilayer film is formed by periodically forming a Si layer and an $SiO_2$ layer using a plasma CVD technique. In the method described in Patent Document 1, since a multilayer film is formed by simply changing a material gas, a layer can be formed at a high speed, as compared with a vapor deposition technique or a sputtering technique.

In addition, Non-Patent Document 2 describes a method in which a periodic structure is formed by polishing a plurality of dielectric substrates or semiconductor substrates to a predetermined thickness and bonding the substrates together.

[Patent Document 1] Japanese Unexamined Patent Application Publication No. 2004-109827 [Non-Patent Document 1] "Optical Thin Film User's Handbook", Shigetaro Ogura, The Nikkan Kogyo Shimbun, 1991, pp. 138-142
[Non-Patent Document 2] Highly tunablephotonic crystal filter for the terahertz range, H. Nemec, P. Kuzel, L. Duvillaret, A. Pashkin, M. Dressel, and M. T. Sebastian, optics letters, vol. 30, No. 5, 2005

However, since a terahertz band lies in a range of wavelength from several hundred μm to several mm, the existing design method and the existing manufacturing method cannot be applied for the following reasons.

First Problem

In existing optical filters, such as the optical filter described in Non-Patent Document 1, used for a range from infrared to visible light, the thickness of a layer is 1 μm or less, and the thickness of the device ranges from 1 to 20 μm. Accordingly, even when the number of stacked devices reaches about 20 to 100, the device can be mass-produced using a vapor deposition technique or a sputtering technique.

However, in order to use a device in a terahertz band from a frequency of 0.1 THz to a frequency of 3 THz, the thickness of a layer becomes as large as about 10 μm to 1 mm, and therefore, the thickness of the device sometimes becomes several mm. Accordingly, if the optical filter is produced using a vapor deposition technique or a sputtering technique, a significant amount of time and costs are required for forming a layer. Thus, it is difficult to mass-produce the optical filter.

To solve this problem, as described in Patent Document 1, layers of Si and SiO$_2$ are periodically formed by using a plasma CVD technique so as to form a multilayer film. However, this optical filter supports only a wavelength range of around a dozen μm. The optical filter cannot cover the entire terahertz band.

Second Problem

In general, a variety of dielectric materials, such as the above-described dielectric oxide material, have a dispersion characteristic in which the dielectric constant varies in accordance with a frequency. As a result of the dispersion, the dielectric constant in a terahertz band markedly varies as compared with that in a range from visible light to near infrared. The above-described optical multilayer filter is designed on the assumption that the optical multilayer filter employs a widely used material having an index of refraction of about 1.5 to 5. However, for example, titanium oxide (TiO$_2$) having an index of refraction of about 2.4 in a visible light range has an index of refraction of about 10 in a terahertz band. That is, the index of refraction increases more than threefold. Since the filter characteristic significantly varies in accordance with the dielectric constant of the material of the filter, desired bandwidth and attenuation gain may not be obtained if an existing design method is used.

Third Problem

When the above-described dielectric oxide material is used in a terahertz band, the dielectric loss tends to increase as a result of the dielectric dispersion, as compared with that in a range from visible light to infrared. As in a microwave band, the Qf constant rule is applicable even in a terahertz band. As the frequency increases, the Q value disadvantageously deteriorates. This is particularly true for a high refractive index material. Accordingly, in an existing design, a sufficient transmission intensity may not be obtained.

SUMMARY OF THE INVENTION

In general, such terahertz band optical filters need to have characteristics of a maximum passband transmittance of more than −5 dB and an attenuation gain of −20 to −30 dB. In addition, variations in the center frequency due to changes in temperature need to be minimized.

To solve the above-described problems, the present inventor and colleagues have studied a method for designing a filter having a rectangular bandpass characteristic in a range from 0.2 to 0.5 THz. As a result of the study, the present inventors have discovered that the following structure provides the characteristics of a maximum passband transmittance of more than −5 dB and an attenuation gain of −30 dB or more: the refractive index ratio between the high refractive index layer and the low refractive index layer is 2 or more; a cavity layer formed from a low refractive index material is sandwiched by a pair of reflecting layers or more; and second and third cavity layers each formed from a high refractive index material are disposed at either end of the cavity layer sandwiched by a pair of reflecting layers or more.

However, in that filter, the transmittance tends to attenuate as the target frequency increases. This is because the filter loss largely depends on the dielectric loss (tan δ=1/Q) of a medium used for the cavity layer.

In addition, the temperature characteristic of the filter largely depends on the temperature coefficient ($\tau_\epsilon$) of the dielectric constant of the medium used for the cavity layer. Many types of material having a low $\tau_\epsilon$ are available for the low refractive index medium. However, only a few types of material having a low $\tau_\epsilon$ are available for the high refractive index medium. As a result, like the above-described Q problem, in the structure in which a high refractive index material is used for part of the cavity layer, it is difficult to obtain a stable temperature characteristic.

Accordingly, the present invention provides a terahertz band optical filter of a multi-cavity type having a small number of layers so as to be manufactured at low cost and have a desired bandpass characteristic for a variety of wavelengths.

The present invention further provides a terahertz band optical filter that can achieve a terahertz band optical bandpass filter capable of maintaining a high transmittance even when the target frequency is increased and having predetermined attenuation gain, passband width, and stopband, and in particular, a terahertz band optical filter having an excellent temperature characteristic so that a predetermined passband width can be set over a wide temperature range.

To solve the above-described problems, according to the present invention, a terahertz band optical filter has the following dielectric multilayer periodic structure.

The dielectric multilayer periodic structure includes a first cavity layer formed from a low refractive index medium and having an optical path length of an integer multiple of ½ wavelength of a passband center frequency, where the first cavity layer is sandwiched by basic gratings each including a layer of a high refractive index medium and a layer of a low refractive index medium stacked together, an optical path length of each of the layers is a ¼ wavelength, the refractive index ratio between the layers is 2 or more, a second cavity layer is disposed at one end of one of the basic gratings, and a third cavity layer is disposed at one end of the other basic grating. The second and third cavity layers have an optical path length of an integer multiple of ½ wavelength of the passband center frequency and are formed from a high refractive index medium having a refractive index higher than that of the low refractive index medium used for the first cavity layer.

For example, only one pair of the basic grating layers is used.

Basic gratings each including a layer of a high refractive index medium and a layer of a low refractive index medium stacked together may be further layered at either end of the dielectric multilayer periodic structure.

In addition, each of the basic gratings disposed at either end of the dielectric multilayer periodic structure may include three layers formed by alternately stacking a layer of a high refractive index medium and a layer of a low refractive index medium each having an optical path length of a ¼ wavelength and having a refractive index ratio of 2 or more.

The optical path length of the first cavity layer may be an integer multiple of a ½ wavelength of the passband center frequency, and the multiple number is determined in accordance with the passband width.

The first cavity layer may be an air layer formed by a spacer, and a moving mechanism for changing the thickness of the air layer formed by the space may be provided.

In addition, according to the present invention, a terahertz band optical filter has the following dielectric multilayer periodic structure. The dielectric multilayer periodic structure includes N(N>2) cavity layers each formed from a low refractive index medium and having an optical path length of an integer multiple of a ½ wavelength of a passband center frequency. The N cavity layers are coupled with each other with a single-layer coupling layer therebetween into a multi-cavity structure. The coupling layer has an optical path length of a ¼ wavelength of the passband center frequency and is formed from a high refractive index medium having a refractive index ratio of 2 or more with respect to the low refractive index medium. Matching layers each including a layer of a high refractive index medium and a layer of a low refractive index medium are disposed at either end of the multi-cavity structure, the layers have different dielectric constants, and each of the layers has an optical path length of an integer multiple of a ¼ wavelength of the passband center frequency.

The optical path length of the cavity layer may be greater than or equal to one wavelength of the passband center frequency, and one or more adjustment layers having an optical path length of a ½ wavelength of a passband center frequency and formed from a low refractive index medium having a dielectric constant lower than that of the high refractive index medium of the matching layer and that of the coupling layer may be disposed at either end of the multi-cavity structure between the cavity layer and the matching layer. The adjustment layers may be coupled with a coupling layer therebetween, the coupling layer may have an optical path length of a ¼ wavelength of a passband center frequency, and the coupling layer may be formed from a high refractive index medium having a dielectric constant higher than that of the adjustment layer.

The optical path length of the cavity layer may be greater than or equal to a 3/2 wavelength of the passband center frequency, and one or more second adjustment layers having an optical path length of one wavelength of a passband center frequency and formed from a low refractive index medium having a dielectric constant lower than that of the coupling layer may be disposed between the multi-cavity structure and the adjustment layer and between the cavity layer and the adjustment layer. The second adjustment layers may be coupled with a coupling layer therebetween, the coupling layer may have an optical path length of a ¼ wavelength of a passband center frequency, and the coupling layer may be formed from a high refractive index medium having a dielectric constant higher than that of the adjustment layer and that of the second adjustment layer.

The optical path length of the layer of the high refractive index medium of the matching layer may be changed to an integer multiple of a ⅛ wavelength of a passband center frequency.

The terahertz band optical filter is produced by forming a laminated structure by stacking dielectric ceramic raw sheets of at least two types having a refractive index ratio of 2 or more together, and subsequently, firing the laminated structure at one time.

When the terahertz band optical filter is designed, the passband width is determined by determining the optical path length of the multi-cavity structure.

According to the present invention, the basic structure of a terahertz band optical filter is a dielectric multilayer periodic structure and a multi-cavity structure including a plurality of cavity layers. Since incident electromagnetic waves are reflected at a position at which a basic grating including a layer of a high refractive index medium and a layer of a low refractive index medium stacked together each having an optical path length of an integer multiple of ¼ wavelength of the passband center frequency, the basic grating serves as a mirror.

Since a cavity layer having an optical path length of a ½ wavelength of the passband center frequency or an integer multiple of ½ wavelength of the passband center frequency satisfies a condition that electromagnetic waves resonate, the cavity layer serves as a resonant layer of a filter. The resonant effect can be increased by the basic grating layers (i.e., the mirror layers) disposed at either ends of the cavity layer. The wavelength of the resonant frequency is the wavelength of the passband center frequency of the filter.

According to the present invention, by providing the basic grating including a layer of a high refractive index material and a layer of a low refractive index material stacked together having a refractive index ratio of 2 or more, the interference effect of optical waves can be increased. In addition, by disposing cavity layers of a high refractive index dielectric medium at either end of the first cavity layer with the basic grating layer therebetween, a bandpass filter having sufficient wavelength selectivity can be achieved using even a small number of layers. Thus, a manufacturing process of the terahertz band optical filter can be facilitated.

Since the basic gratings form a pair, the total number of layers can be minimized. In addition, a rectangular bandpass characteristic can be obtained.

In addition, by further disposing basic gratings at either end of the periodic layer structure as needed, a filter having a higher stopband gain can be achieved.

Furthermore, when each of the basic gratings disposed at either end of the periodic layer structure includes three layers formed by alternately stacking a layer of a high refractive index medium and a layer of a low refractive index medium, a rectangular filter characteristic having a small number of ripples can be obtained.

Still furthermore, by determining the optical path length of the first cavity layer to be an integer multiple of a ½ wavelength of the passband center frequency and determining the multiple number in accordance with the passband width, only the bandwidth can be determined without introducing distortion into the waveform and without changing the transmission intensity in the passband.

In particular, when the first cavity layer is an air layer formed by a spacer, and a moving mechanism for changing the thickness of the air layer formed by the space is provided, a function of controlling the passband width within a predetermined range as needed during use of the filter can be provided.

In addition, according to the present invention, a terahertz band optical filter has a multi-cavity structure including a plurality of cavity layers. In particular, all of the cavity layers are formed from a low refractive index medium and are connected to each other with only a coupling layer formed from a single layer of a high refractive index medium and having a ¼ wavelength of the passband center frequency. Many types of material having a low dielectric loss (a high Q value) and a low temperature coefficient ($\tau_e$) are available for the low refractive index medium. Therefore, by forming the cavity using such a material, the characteristics of the filter can be improved.

Furthermore, by setting the refractive index ratio of the high refractive index medium to the low refractive index medium to 2 or more, a wide stopband and a large attenuation gain can be obtained. In addition, a sufficient interference effect of optical waves can be obtained through even a limited number of layers.

In existing multi-cavity structures, a plurality of ¼ wavelength layers need to be disposed between cavities. Since the ¼ wavelength layers functions as reflecting layers, insertion loss occurs. However, by connecting the cavity layers using only a single-layer high refractive index coupling layer to dispose the cavity layers in a multiple fashion, a filter having a small transmission loss while maintaining a certain attenuation gain can be obtained.

According to the present invention, the matching layer is formed from a pair consisting of a ¼ wavelength low refractive index layer and a ¼ wavelength high refractive index layer. In particular, by forming a layer disposed at an end of the structure using a low refractive index layer, excellent impedance matching with an external electric field can be obtained.

In addition, one or more adjustment layers having an optical path length of a ½ wavelength of a passband center frequency and formed from a low refractive index medium are disposed at either end of the multi-cavity structure between the cavity layer and the matching layer. The adjustment layers are coupled with a coupling layer therebetween, the coupling layer has an optical path length of a ¼ wavelength of a passband center frequency, and the coupling layer is formed from a high refractive index medium. In this way, the intensity of a spurious component occurring in the stopbands at either end of the passband caused by an increase in the optical path length of a cavity can be reduced.

Furthermore, one or more second adjustment layers having an optical path length of one wavelength of a passband center frequency and formed from a low refractive index medium are disposed between the multi-cavity structure and the adjustment layer and between the cavity layer and the adjustment layer, and the second adjustment layers are coupled with a coupling layer therebetween. The coupling layer has an optical path length of a ¼ wavelength of a passband center frequency, and the coupling layer is formed from a high refractive index medium. In this way, the intensity of a spurious component occurring in the stopbands at either end of the passband caused by an increase in the optical path length of a cavity can be reduced.

Still furthermore, by changing the optical path length of the layer of the high refractive index medium of the matching layer to an integer multiple of a ⅛ wavelength of a passband center frequency, the second-order Fabry-Perot component appearing on the high-frequency side of the main passband can be reduced.

Yet still furthermore, by forming a laminated structure by stacking dielectric ceramic raw sheets of at least two types having a refractive index ratio of 2 or more together, and subsequently, firing the laminated structure at one time, the terahertz band optical filter can be produced at a production cost lower than those in existing manufacturing methods. Thus, the terahertz band optical filter can be mass-produced with excellent industrial productivity.

Since the optical path length of the multi-cavity structure is determined when the terahertz band optical filter is designed, the passband width in a predetermined range can be determined by the optical path length of the cavity layer. By using this method, even when a design change in the bandwidth is carried out, a variation in transmittance caused by the design change can be reduced.

Figure 1:
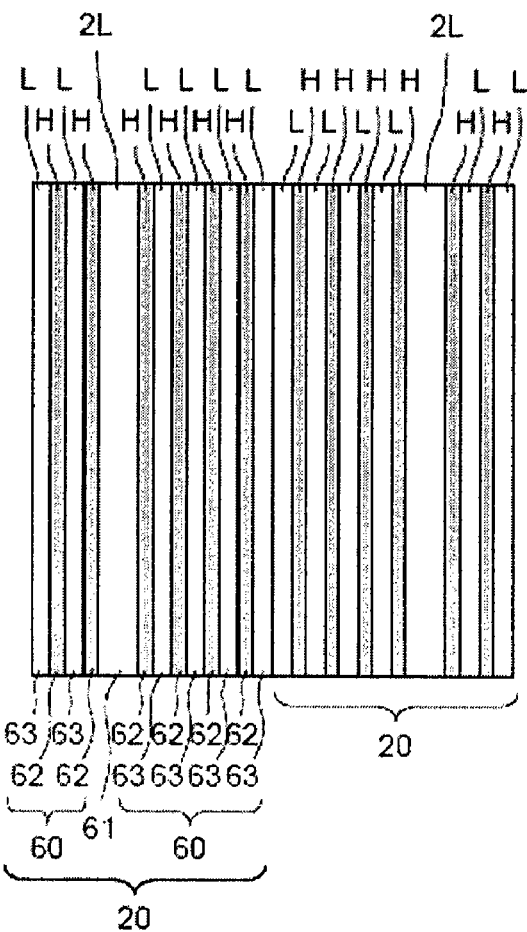
FIG. 1 is a cross-sectional view of an optical bandpass filter having a dielectric multilayer structure described in Non-Patent Document 1.

REFERENCE NUMERALS 1, 5 high refractive index medium
2, 4 low refractive index medium
3, 6 basic grating
7 spacer
8 moving mechanism
9 air layer
11 first cavity layer
12 second cavity layer
13 third cavity layer
20 unit block
30 multi-cavity structure
40 matching layer
51, 61 cavity layer
52, 62 high refractive index layer
53, 63 low refractive index layer
54 coupling layer
55 adjustment layer
56 second adjustment layer
60 reflecting layer

DETAILED DESCRIPTION OF THE INVENTION

First Embodiment

Figure 2:
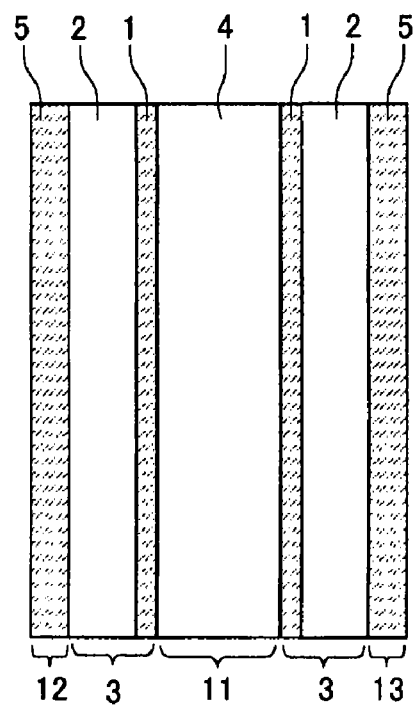
FIG. 2 is a cross-sectional view of the terahertz band optical filter according to a first embodiment.

A terahertz band optical filter according to a first embodiment is described below with reference to FIGS. 2 and 3. FIG. 2 is a cross-sectional view of the terahertz band optical filter according to a first embodiment.

This terahertz band optical filter includes a first cavity layer 11 formed from a low refractive index medium (a low dielectric constant medium) 4 and having an optical path length of a multiple integer of $\lambda_O/2$, a basic grating 3 including a layer formed from a high refractive index medium (a high dielectric constant medium) 1 and having an optical path length of $\lambda_O/4$ and a layer formed from a low refractive index medium 2 and having an optical path length of $\lambda_O/4$, and a second cavity layer 12 and a third cavity layer 13 each formed from a high refractive index medium 5 and having an optical path length of a multiple integer of $\lambda_O/2$.

As shown in FIG. 2, the high refractive index media 1 of the basic gratings 3 are disposed at either end of the first cavity layer 11 so as to be in contact with the low refractive index medium 4 and be symmetrical to each other. In addition, the second cavity layer 12 and the third cavity layer 13 are disposed at an end of either of the basic gratings 3.

A $TiO_2$-based material is used for the high refractive index media 1 and 5, while an $Al_2O_3$-based composite material is used for the low refractive index media 2 and 4. According to a measurement using the THz-TDS (Terahertz Time Domain Spectroscopy) method, the index of refraction of $Al_2O_3$ in a terahertz band ranges from 3.3 to 3.4. The index of refraction of $TiO_2$ in a terahertz band ranges from 10.4 to 10.5. The refractive index ratio ranges from 3.0 to 3.2. These materials are also used for all of the following embodiments. However, it should be noted that the present invention is not limited thereto.

Figure 3:
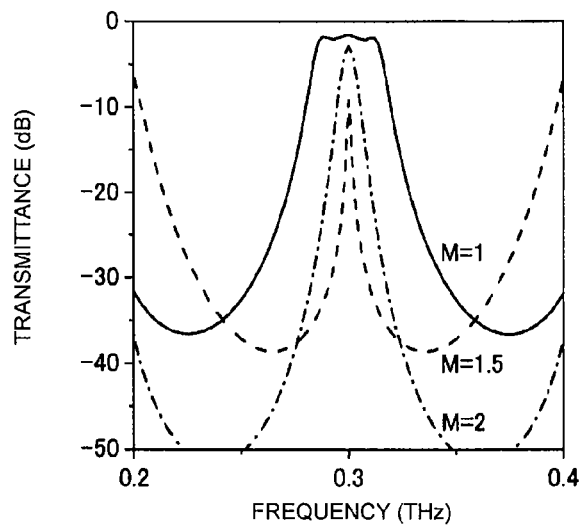
FIG. 3 illustrates a bandpass characteristic of the terahertz band optical filter according to a first embodiment and a change in the bandpass characteristic when the number of pairs of the basic gratings 3 is changed.

FIG. 3 illustrates a filter bandpass characteristic when the passband central wavelength $\lambda_O$ is 1 mm (0.3 THz), and the optical path length of the first cavity layer is $\lambda_O$, where M denotes the number of pairs in the basic grating. Here, M=1 represents that the number of pairs in the basic grating is 1, that is, a state in which, as shown in FIG. 2, a layer of the high refractive index medium 1 having an optical path length of $\lambda_O/4$ is stacked on a layer of the low refractive index medium 2 having an optical path length of $\lambda_O/4$. In addition, the high refractive index medium 1 of the basic grating is 24 µm in thickness. The low refractive index medium 2 of the basic grating is 73.5 µm in thickness. The low refractive index medium 4 of the first cavity layer 11 is 294 µm in thickness. The high refractive index medium 5 of each of the second cavity layer 12 and the third cavity layer 13 is 48 µm in thickness.

In this structure, by setting the refractive index ratio between the high refractive index medium ($TiO_2$) layer and the low refractive index medium ($Al_2O_3$) layer to 3.1 that is greater than 2, the interference effect of optical waves can be increased. Furthermore, by disposing the second cavity layer 12 and the third cavity layer 13 made from a high refractive index medium at either end of the first cavity layer with the basic grating therebetween, the interference effect of optical waves can be increased while decreasing the total number of layers.

This structure can provide the following characteristics: the average passband transmittance is −1.6 dB, the −3 dB bandwidth is 10.7% of the passband central wavelength, and a stopband gain is −36 dB in the stopband. Therefore, it can be seen that the structure of the first embodiment can achieve a terahertz band optical filter that properly operates as a terahertz band bandpass filter by using only seven layers.

In addition, FIG. 3 illustrates the characteristics when the number of pairs M in the basic grating is changed. Here, M=2 represents that a high refractive index medium layer having an optical path length of $\lambda_O/4$ and a low refractive index medium layer having an optical path length of $\lambda_O/4$ are alternately stacked in four layers. In addition, M=1.5 represents that the high refractive index medium layer and the low refractive index medium layer are alternately stacked in three layers.

As shown in FIG. 3, in the case of M=1, the following rectangular bandpass characteristic can be obtained: a high transmittance is achieved in a passband with a small ripple, and a transmittance lower than a predetermined value is achieved in a stopband. In the case of other number of pairs (M=1.5 or more), a change in transmittance in the vicinity of the passband is steep. Accordingly, a rectangular bandpass characteristic cannot be obtained. Therefore, in order to obtain a rectangular bandpass characteristic, it is desirable that the number of pairs in the basic grating is 1.

In the example shown FIG. 3, the low refractive index medium 4 of the first cavity layer 11 is formed from a material the same as that of the low refractive index medium 2 of the basic grating. However, the low refractive index medium 4 of the first cavity layer 11 may be formed from a third medium different from the low refractive index medium 2 of the basic grating. In particular, by using a medium having a low dielectric loss, the intensity attenuation in the passband can be reduced.

The above-described structure can achieve a terahertz band optical filter that is difficult to produce using existing methods with a small number of layers. Accordingly, the manufacturing process can be facilitated. In addition, since the number of layers is small, the thickness of a device can be reduced. Therefore, this structure is advantageous when the device is assembled in a variety of optical systems.

Second Embodiment

A terahertz band optical filter according to a second embodiment is described next with reference to FIGS. 4 to 6.

Figure 4:
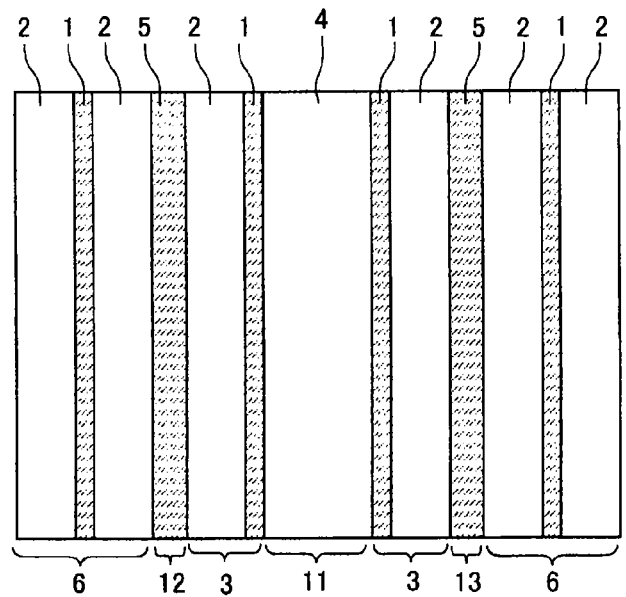
FIG. 4 is a cross-sectional view of a terahertz band optical filter according to a second embodiment.

FIG. 4 is a cross-sectional view of the terahertz band optical filter according to a second embodiment. The structure of this terahertz band optical filter includes the structure of the first embodiment as a basic structure. Other basic gratings 6 are further added at either end of the basic structure.

As shown in FIG. 4, a layer of the high refractive index medium 1 and a layer of the low refractive index medium 2 each having an optical path length of a ¼ wavelength and having a refractive index ratio of 2 or more are alternately stacked in three layers (the number of pairs M=1.5) so that the basic grating 6 is achieved. In this example, since the second cavity layer 12 and the third cavity layer 13 are formed from the high refractive index medium 5, a layer of the high refractive index medium 1 is sandwiched by layers of the low refractive index medium 2 so that the low refractive index media 2 are in contact with the second cavity layer 12 and the third cavity layer 13. The other sections of the basic structure are similar to those of the first embodiment.

The high refractive index medium 1 of the basic grating 6 is formed from $TiO_2$ having an index of refraction of 10.4, while the low refractive index medium 2 of the basic grating 6 is formed from $Al_2O_3$ having an index of refraction of 3.4.

Figure 5:
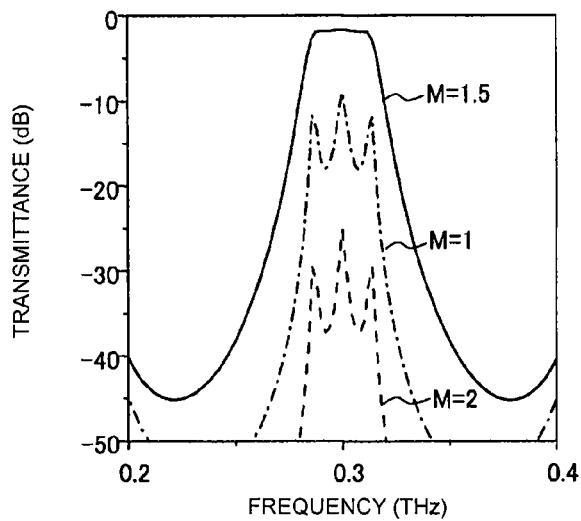
FIG. 5 illustrates a bandpass characteristic of the terahertz band optical filter according to a second embodiment and a change in the bandpass characteristic when the number of pairs of the basic gratings 6 is changed.
Figure 6:
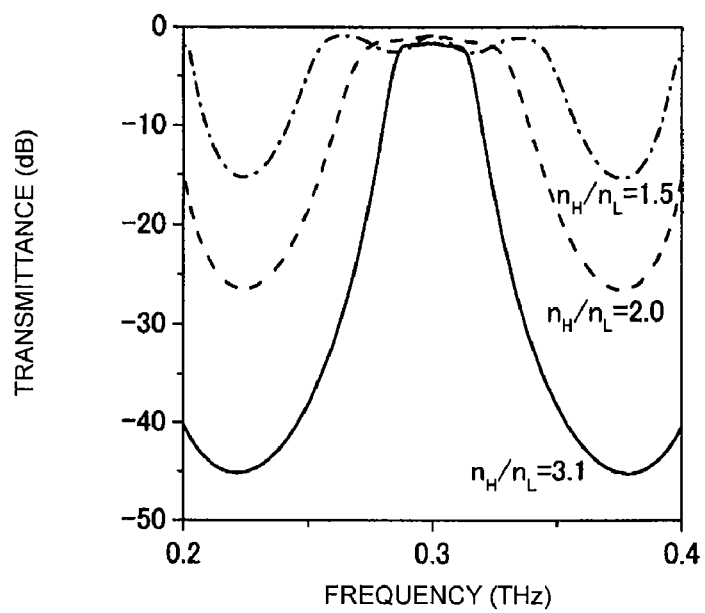
FIG. 6 illustrates the bandpass characteristics of the terahertz band optical filter according to a second embodiment and a change in the bandpass characteristic when a refractive index ratio (nH/nL) of the refractive index of a high refractive index medium layer to the refractive index of a low refractive index medium layer is changed.

FIG. 5 illustrates a filter bandpass characteristic when the number of pairs M=1.5, as shown in FIG. 4, the passband central wavelength $\lambda_O$ is 1 mm (0.3 THz), and the optical path length of the first cavity layer is $\lambda_O$. Here, the high refractive index medium 1 of the basic grating is 24 μm in thickness. The low refractive index medium 2 of the basic grating is 73.5 μm in thickness. The low refractive index medium 4 of the first cavity layer 11 is 294 μm in thickness. The high refractive index medium 5 of each of the second cavity layer 12 and the third cavity layer 13 is 48 μm in thickness.

According to this structure, the following characteristics can be obtained: the average passband transmittance is −1.6 dB, the −3 dB bandwidth is 10.6% of the passband central wavelength, and a stopband gain in the stopband reaches −45 dB. As described above, by disposing additional basic grating layers on either ends of the periodic layer structure described in the first embodiment, a filter that provides a higher stopband gain in the stopband can be achieved. In the first embodiment (indicated by a solid line in FIG. 3), the stopband gain is −38 dB. In contrast, in the second embodiment (indicated by a solid line in FIG. 5), the stopband gain is −45 dB. Thus, it can be seen that the wavelength selection function of a filter is further improved.

Furthermore, according to this structure, the transmission intensity in the passband can be markedly attenuated. Alternatively, the stopband gain can be increased without introducing distortion into the waveform.

In addition, FIG. 5 illustrates the characteristics when the number of pairs M in the basic grating 6 is changed. Here, M=1 represents that a layer of a high refractive index medium 1 having an optical path length of $\lambda_O/4$ is stacked on a layer of a low refractive index medium 2 having an optical path length of $\lambda_O/4$. In addition, M=2 represents that a layer of the high refractive index medium 1 having an optical path length of $\lambda_O/4$ and a layer of the low refractive index medium 2 having an optical path length of $\lambda_O/4$ are alternately stacked in four layers. As shown in FIG. 5, by setting the number of pairs M in the basic grating 6 disposed at either side of the basic structure to 1.5, a bandpass characteristic having small ripples and a high transmittance in the passband can be obtained. Accordingly, it is desirable that the number of pairs in the basic grating 6 is 1.5.

In the second embodiment, the refractive index ratio (nH/nL) between the layer of the high refractive index medium and the layer of the low refractive index medium of the basic structure is set to 3.1. FIG. 6 illustrates the characteristics when this refractive index ratio is changed. As can be seen, when the refractive index ratio (nH/nL) is small, the stopband gain is decreased. When nH/nL=1.5, the stopband gain is −15 dB. Thus, a sufficient stopband characteristic cannot be obtained. Accordingly, in a filter having a small number of layers according to the present invention, it is desirable that the refractive index ratio (nH/nL) is set to 2 or more in order to obtain a sufficient filter characteristic.

Note that if the index of refraction of the low refractive index medium 2 of the basic grating is too small, a sufficient interference effect cannot be obtained. Accordingly, it is desirable to employ a medium having an index of refraction of about 2 or more.

Note that, as in the second embodiment, in the basic grating of the basic structure according to the first embodiment, the stopband gain tends to decrease if the refractive index ratio (nH/nL) is small. Accordingly, in order to obtain a sufficient filter characteristic, it is also desirable to employ a medium having an index of refraction of about 2 or more for the filter of the basic structure according to the first embodiment.

Third Embodiment

A terahertz band optical filter according to a third embodiment is described next with reference to FIG. 7. In the third embodiment, a method for changing a passband width by setting the optical path length of the first cavity layer of the first and second embodiments to an integer multiple of $\lambda_O/2$ is described.

Figure 7:
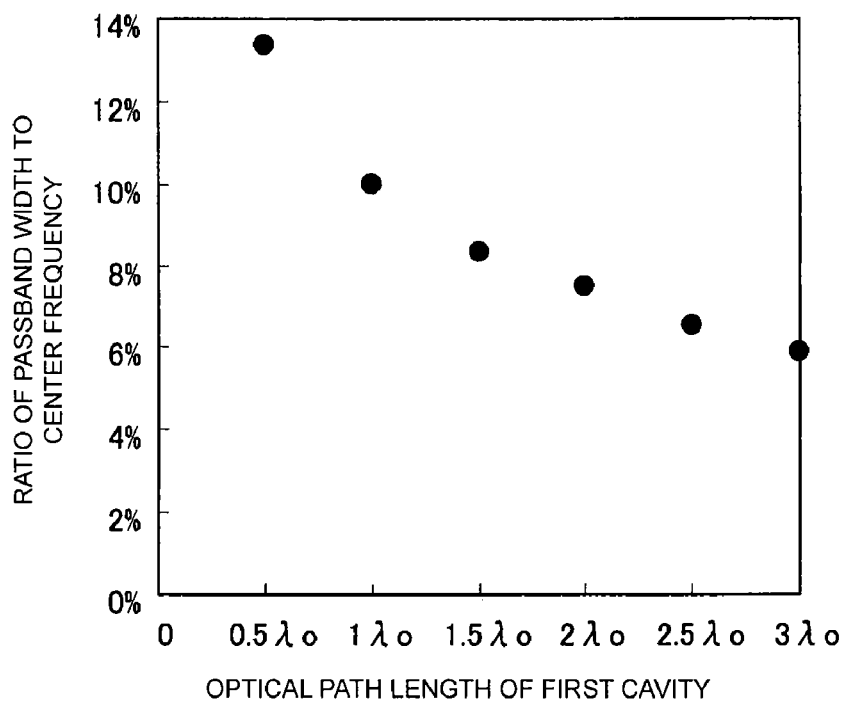
FIG. 7 illustrates a relationship between the passband width and the optical path length of a first cavity layer of a terahertz band optical filter according to a third embodiment.

FIG. 7 illustrates a change in a −3 dB passband width when the optical path length of the first cavity layer in the multi-cavity structure according to the first embodiment is changed from $\lambda_O/2$ to $3\lambda_O$.

As can be seen from FIG. 7, as the optical path length of the first cavity layer is increased by an integer multiple of $\lambda_O/2$, the bandwidth of the passband decreases. In this example, when the optical path length is $\lambda_O/2$, the bandwidth is about 13% of the central wavelength $\lambda_O$. However, when the optical path length is increased to $3\lambda_O$, the bandwidth can be decreased to about 6% of the central wavelength $\lambda_O$.

By using this effect, the passband width of the filter can be changed within a predetermined range, and therefore, a filter having the passband width for the intended use can be achieved. In addition, by changing only the optical path length of the first cavity layer without changing the optical path lengths of the second and third cavity layers, the transmission intensity in the passband can be markedly attenuated, or the passband width can be changed without introducing distortion into the waveform.

Fourth Embodiment

A terahertz band optical filter according to a fourth embodiment is described next with reference to FIG. 8. The terahertz band optical filter according to the fourth embodiment has a function for variably changing the passband width.

Figure 8:
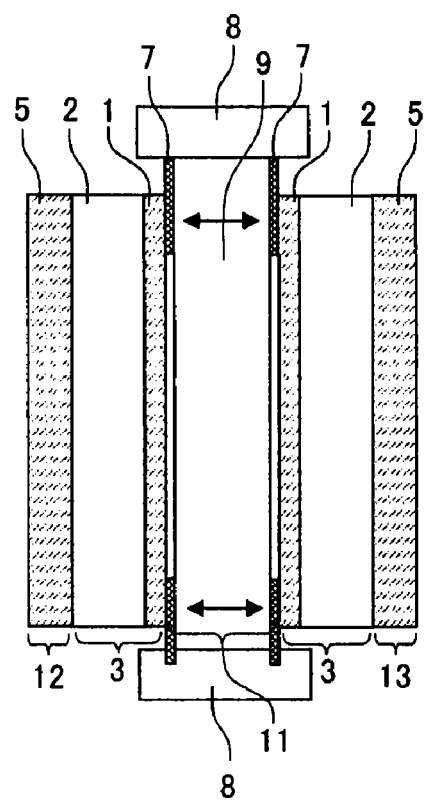
FIG. 8 is a cross-sectional view of a terahertz band optical filter according to a fourth embodiment.

As shown in FIG. 8, this terahertz band optical filter includes a first cavity layer 11 composed of an air layer 9 and having an optical path length of an integer multiple of $\lambda_O/2$, basic gratings 3 each including a layer of the high refractive index medium 1 having an optical path length of $\lambda_O/4$ stacked on a layer of the low refractive index medium 2 having an optical path length of $\lambda_O/4$, and a second cavity layer 12 and a third cavity layer 13 each composed of the high refractive index medium 5 and having an optical path length of an integer multiple of $\lambda_O/2$.

Portions disposed outside either end of the first cavity layer 11 are formed from dielectric ceramic laminated bodies. The first cavity layer 11 is formed by spacers having an opening. The spaces are made of a metal or a plastic having a predetermined thickness. In addition, the two ceramic laminated bodies are supported by moving mechanisms 8 in the spacer portions so that a predetermined spacing is maintained therebetween. The distance between the ceramic laminated bodies disposed at either end of the spacer (the optical path length of the first cavity layer 11) is set to an integer multiple of ½ of the passband central wavelength $\lambda_O$.

More specifically, for example, a spacer 7 is formed from two plates. By providing the moving mechanism 8 between the two plates, the thickness of the air layer 9 (the optical path length of the first cavity layer 11) can be mechanically changed. When the optical path length of the first cavity layer 11 is changed so as to be an integer multiple of ½ of the passband central wavelength $\lambda_O$, the passband width is changed, as illustrated in the third embodiment.

Such a structure provides a function for changing the passband width during use of the filter as needed.

In addition, to change the optical path length of the first cavity layer 11, a method for electrically changing the distance using a piezoelectric element can be employed.

Fifth Embodiment

A terahertz band optical filter according to a fifth embodiment is described next with reference to FIGS. 9 to 13.

Figure 9:
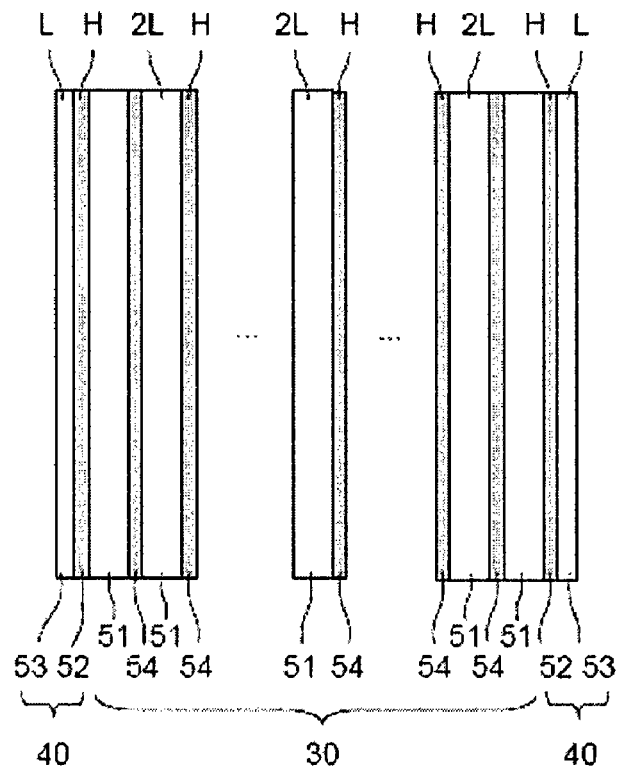
FIG. 9 is a cross-sectional view of a terahertz band optical filter according to a fifth embodiment.

FIG. 9 is a cross-sectional view of the terahertz band optical filter according to a fifth embodiment. As shown in FIG. 9, a cavity layer 51 has an optical path length that is n times $\lambda_O/2$ (where n is an integer greater than or equal to 1). In addition, the cavity layer 51 is formed from a low refractive index medium. This low refractive index medium includes air (having an index of refraction of 1) in addition to a variety of dielectric materials. the N cavity layers 51 are provided (where N is an integer greater than or equal to 2). The cavity layers 51 are coupled with each other using a single-layer coupling layer 54 formed from a high refractive index medium and having an optical path length of $\lambda_O/4$. Thus, a multi-cavity structure 30 is formed.

Matching layers 40 are disposed at either end of the multi-cavity structure 30. Each of the matching layers 40 includes a layer of a high refractive index medium (a high refractive index layer) and a layer of a low refractive index medium (a low refractive index layer) each having an optical path length of $\lambda_O/4$. Since the cavity layer 51 is a low refractive index layer, a high refractive index layer 52 of the matching layer 40 is disposed next to the cavity layer 51. A low refractive index layer 53 of the matching layer 40 is disposed so as to be the outermost layer of the structure.

Materials of the high refractive index medium and the low refractive index medium can be appropriately selected so that the refractive index ratio between the high refractive index medium and the low refractive index medium is greater than or equal to 2. When air is used for the low refractive index medium, the above-described multi-cavity structure can be formed by using an air bridge structure or a spacer.

Specific examples of the structure and the characteristics of a filter having an attenuation gain of −30 dB and a transmittance of −5 dB are described below.

A terahertz band optical filter includes 17 dielectric layers, and the structure is represented as follows:

L H 2L H 2L H 2L H 2L H 2L H 2L H 2L H L.

The attenuation gain of the filter changes in accordance with N, the number of the cavity layer 51. In the fifth embodiment, to obtain an attenuation gain greater than or equal to −30 dB, N is set to 7. In addition, the optical path length of each of the cavity layers is set to $\lambda_O/2$ (i.e., n=1).

Accordingly, this structure can also be represented as: LH(2LH)$^7$L.

The design passband central wavelength λ is set to 0.67 mm (0.45 THz). A TiO$_2$-based material having an index of refraction of 10.5 is used for the high refractive index layer, while an Al$_2$O$_3$-based composite material having an index of refraction of 3.3 is used for the low refractive index layer.

Figure 10:
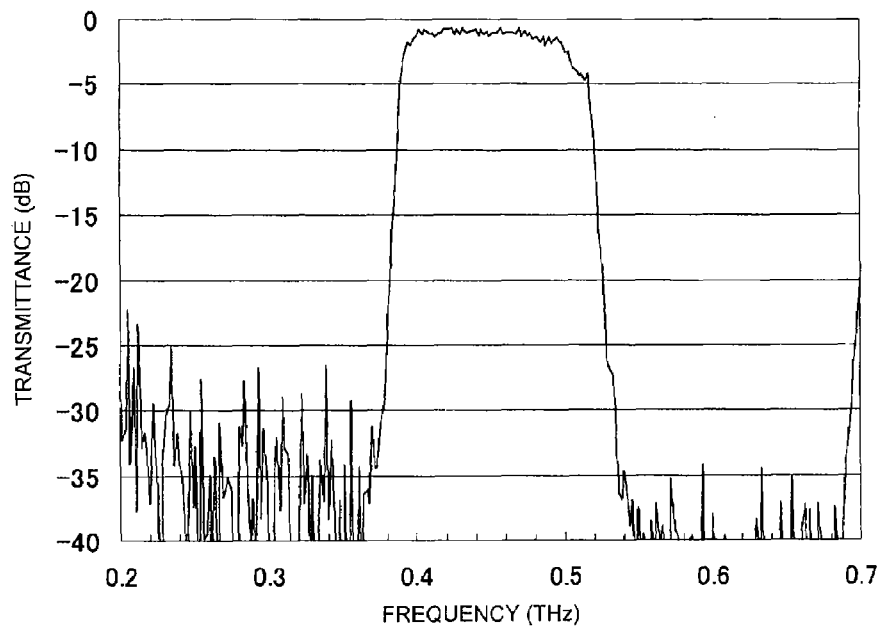
FIG. 10 illustrates the transmission spectrum of the terahertz band optical filter according to a fifth embodiment.

FIG. 10 illustrates the transmission spectrum of the terahertz band optical filter according to the fifth embodiment.

This structure can provide the following characteristics: the average passband transmittance is −1.1 dB, the −3 dB bandwidth for the center frequency is 26.3% (119 GHz), and an attenuation gain is −35 dB in the stopband. Thus, the characteristics that satisfy the above-described requirement specification can be obtained.

The fifth embodiment provides the following advantages:

(1) By setting the refractive index ratio of the high refractive index medium to the low refractive index medium to a value as high as 3.2, the interference effect of optical waves (electromagnetic waves) can be increased. In addition, by using a single-layer coupling layer and multiple cavities connected in a multi-cavity structure, the need for a reflecting layer can be eliminated, and therefore, the transmission loss can be minimized.

(2) By increasing the number of the cavity layers (N), the attenuation gain can be decreased to less than or equal to −30 dB.

(3) Since the temperature coefficient ($\tau_\epsilon$) of the Al$_2$O$_3$-based composite material is substantially zero, the temperature stability can be increased by using this material for all of the cavities.

Figure 11:
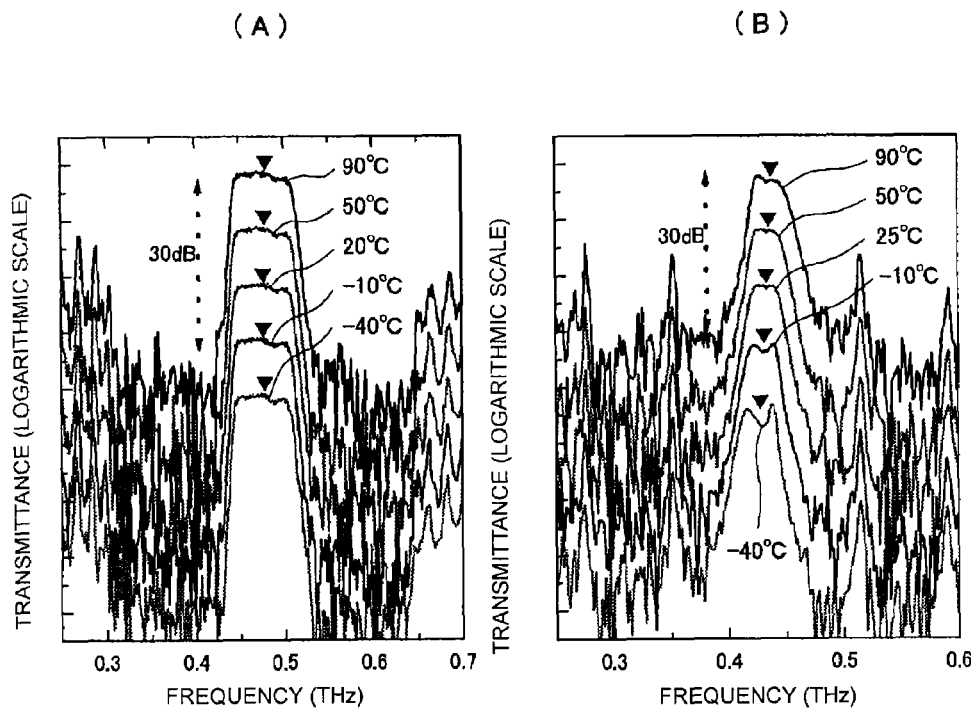
FIG. 11 illustrates a change in the transmission spectrum caused by a change in temperature of the terahertz band optical filter according to a fifth embodiment.

FIG. 11 illustrates a change in a transmission spectrum caused by a change in a temperature of the filter.

FIG. 11(A) illustrates the characteristic of the terahertz band optical filter according to the fifth embodiment when the optical path length of the cavity is $\lambda_O$ (n=4), and the number of the cavity layers N=7.

FIG. 11(B) illustrates the characteristic of a terahertz band optical filter of a comparative example. This filter includes a first cavity layer formed from a low refractive index medium and having an optical path length of an integer multiple of $\lambda_O/2$. The first cavity layer is sandwiched by basic gratings each including a layer of a high refractive index medium and a layer of a low refractive index medium, each having an optical path length of $\lambda_O/4$, having a refractive index ratio of 2 or more. In addition, a second cavity layer is disposed at one end of one of the basic gratings, and a third cavity layer is disposed at one end of the other basic grating. The second cavity layer and the third cavity layer have an optical path length of an integer multiple of $\lambda_O/2$ and are formed from a high refractive index medium.

Figure 12:
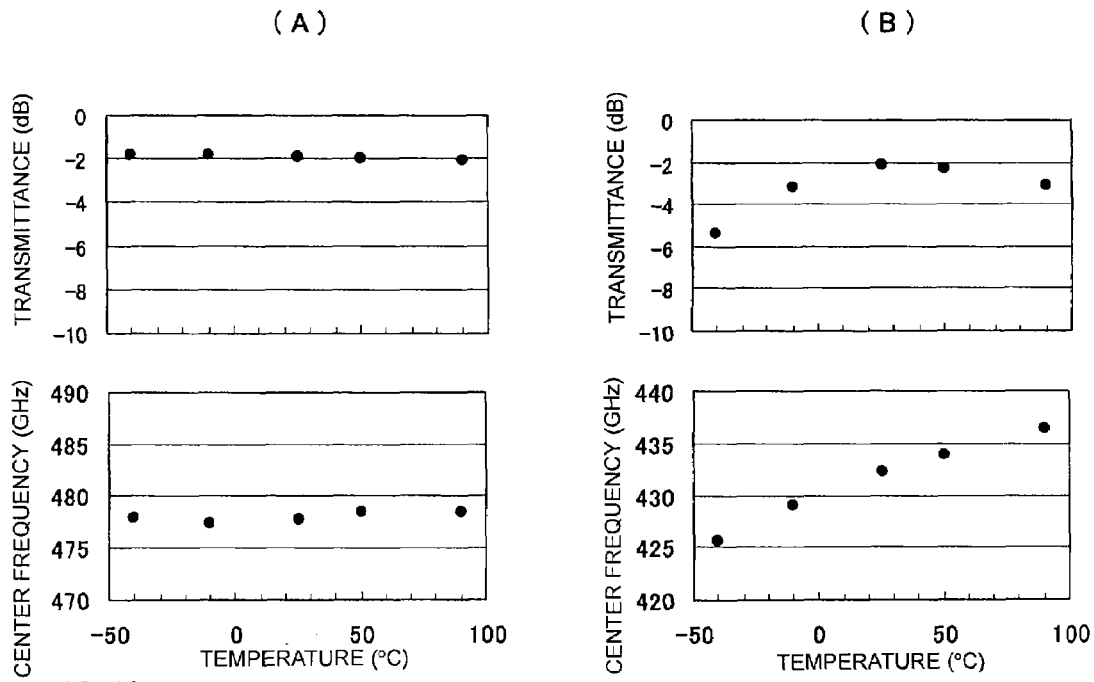
FIG. 12 illustrates changes in the passband center frequency and the transmittance of the terahertz band optical filter according to a fifth embodiment caused by a change in temperature of the filter.

FIG. 12 illustrates changes in the passband center frequency and the transmittance of the filter caused by a change in temperature of those filters.

This measurement was performed by changing a temperature within a normal use temperature range in a laboratory (−40 to 90° C.). FIG. 12(A) is derived from FIG. 11(A), and FIG. 12(B) is derived from FIG. 11(B). As can be seen from FIG. 12, a change in the characteristic of the terahertz band optical filter of a comparative example shown in FIGS. 11(B) and 12(B) is large. However, in the filter according to the fifth embodiment, a frequency shift caused by a temperature change is very small. The temperature change ratio $\tau_f$ is 8 ppm/° C. As described above, according to the present invention, a terahertz band optical filter having an excellent temperature characteristic can be achieved.

While the fifth embodiment has been described with reference to the Al$_2$O$_3$-based composite material for a material having a low temperature coefficient $\tau_\epsilon$ of the dielectric constant, it should be noted that a similar characteristic can be obtained even when another material having a low temperature coefficient $\tau_\epsilon$ is used.

Figure 13:
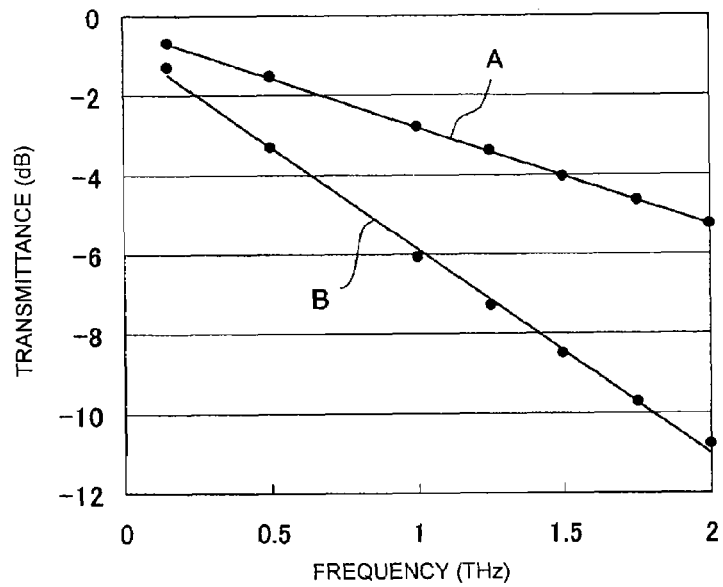
FIG. 13 is a diagram illustrating the attenuation of the terahertz band optical filter according to a fifth embodiment in accordance with an increase in a frequency.

FIG. 13 is a diagram illustrating the result of a study of the attenuation of a filter in accordance with an increase in a frequency. This diagram indicates the transmittance of a filter obtained by simulation at a variety of frequencies while taking into account the dielectric dispersion of a material used.

A line A represents the attenuation of the filter according to the present invention. A line B represents the attenuation of the filter of the above-described comparative example. As can be seen from FIG. 13, the attenuation of the terahertz band optical filter of the above-described comparative example significantly increases with an increase in frequency. At 1

THz, the attenuation is less than or equal to −6 dB. In contrast, the attenuation of the filter according to the present invention is small. Even at 1 THz, a transmittance of higher than or equal to −3 dB can be maintained.

Sixth Embodiment

A terahertz band optical filter according to a sixth embodiment is described next with reference to FIGS. 14 and 15.

According to the present invention, the passband width of a filter can be controlled within a predetermined range by changing the optical path length of the cavity. As the optical path length is increased, the passband width decreases. However, in the structure according to the fifth embodiment, as the optical path length of the cavity is increased, the resonance mode is more multiplexed, and therefore, a spurious component tends to occur.

Accordingly, in the sixth embodiment, an exemplary structure is provided that reduces the spurious component under the condition that the optical path length of the cavity is relatively long ($n \geq 2$).

Figure 14:
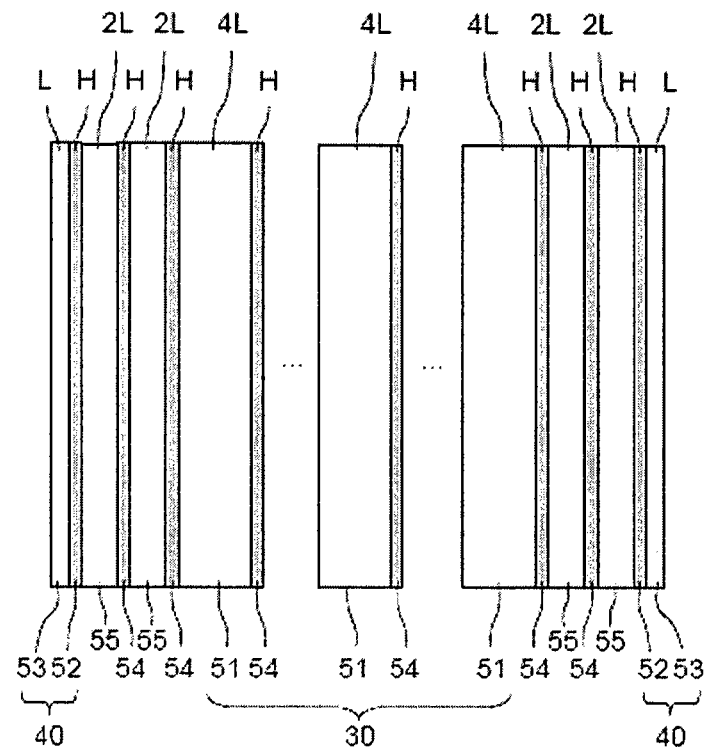
FIG. 14 is a cross-sectional view of a terahertz band optical filter according to a sixth embodiment.

FIG. 14 is a cross-sectional view of a terahertz band optical filter according to the sixth embodiment.

In contrast to the structure of the fifth embodiment, in the sixth embodiment, x adjustment layers 55 each formed from a low refractive index medium and having an optical path length of $\lambda_O/2$ are disposed at either side of the multi-cavity structure 30 between the $n\lambda_O/2$ cavity layer and the $\lambda_O/4$ matching layer. The adjustment layers 55 are joined to each other using the coupling layer 54 having a high refractive index and having an optical path length of $\lambda_O/4$. In the example shown in FIG. 14, n=2, and x=2.

As shown in FIG. 14, when N=4, the terahertz band optical structure includes 19 dielectric layers. The structure is represented as follows:

L H 2L H 2L H 4L H 4L H 4L H 4L H 2L H 2L H L.

Figure 15:
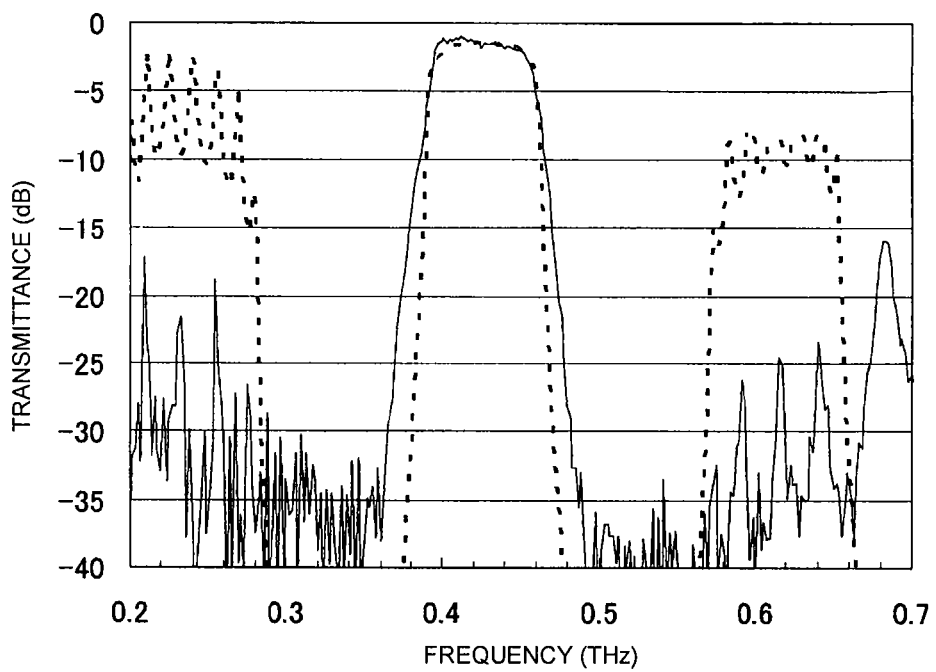
FIG. 15 illustrates the transmission spectrum of the terahertz band optical filter according to a sixth embodiment.

FIG. 15 illustrates the transmission spectrum when the design passband central wavelength $\lambda_O$ is set to 0.7 mm (0.43 THz). In FIG. 15, a solid line represents the characteristic of the filter according to the sixth embodiment. A broken line represents the characteristic of a filter having the structure of the fifth embodiment that does not include the adjustment layers 55 and the coupling layer 54 for joining the adjustment layers 55 together and that has a bandwidth the same as that of the filter of the sixth embodiment.

In the example shown by the broken line, strong spurious components appear on either side of the main transmission peak. However, the filter according to the sixth embodiment has an average passband transmittance of −1.4 dB, the −3 dB bandwidth for the center frequency is 15.6% (66 GHz), and an attenuation gain of −35 dB in the stopband.

As described above, by disposing the adjustment layer 55 having an optical path length of $\lambda_O/2$ between the cavity layer 51 and the matching layer 40 having an optical path length of $\lambda_O/4$, the intensity of the spurious component can be reduced. The number of layers (x) of the adjustment layer 55 can be adjusted in accordance with the optical path length n of the cavity layer 51 and the number N. After examining the optimum number of layers of the adjustment layer 55 in the ranges of n and N applicable to a practical filter, the present inventor discovered that a range of 1<x<4 can minimize the spurious effect. Therefore, when designing a filter, it is desirable that the number of layers of the adjustment layer 55 is determined so as to be a value in this range.

Seventh Embodiment

A terahertz band optical filter according to a seventh embodiment is described next with reference to FIGS. 16 and 17.

The seventh embodiment provides a method for reducing the spurious component that increases when the optical path length of the cavity is increased more than that of the sixth embodiment (i.e., $n \geq 3$).

Figure 16:
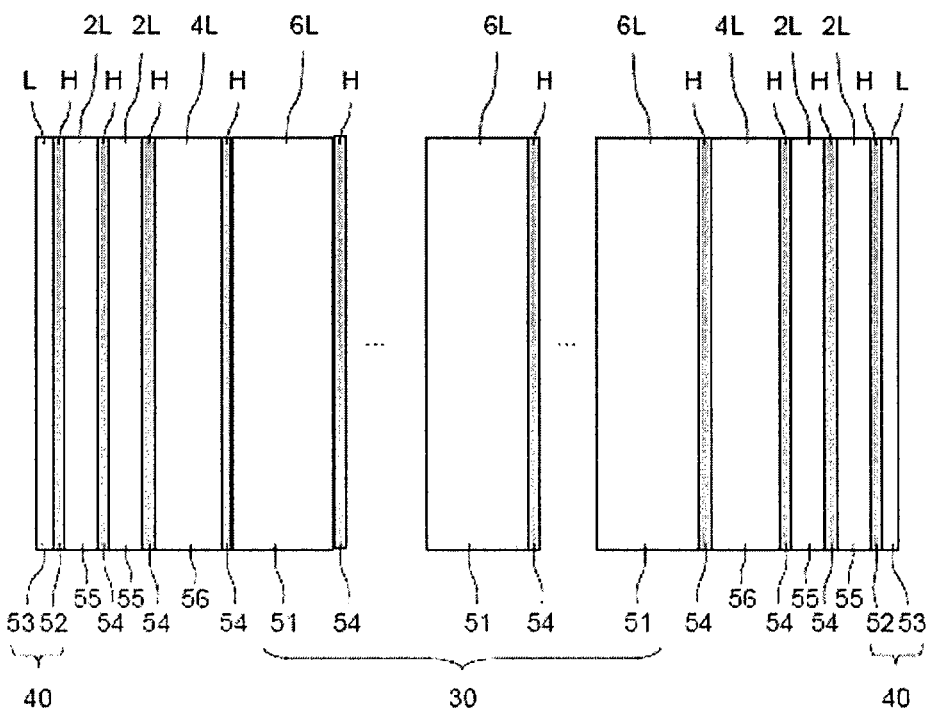
FIG. 16 is a cross-sectional view of a terahertz band optical filter according to a seventh embodiment.

FIG. 16 is a cross-sectional view of a terahertz band optical filter according to the seventh embodiment.

In the seventh embodiment, in contrast to the filter structure of the sixth embodiment, y second adjustment layers 56 each formed from a low refractive index medium and having an optical path length of $\lambda_O$ are disposed at either side of the multi-cavity structure 30 between the $n\lambda_O/2$ cavity layer 51 and the $\lambda_O/2$ adjustment layer 55. The second adjustment layers 56 are joined to each other using a coupling layer 54 having a high refractive index and having an optical path length of $\lambda_O/4$. In the example shown in FIG. 16, n=3, x=2, and y=1.

As shown in FIG. 16, when N=3, the terahertz band optical structure includes 21 dielectric layers. The structure is represented as follows:

L H 2L H 2L H 4L H 6L H 6L H 6L H 4L H 2L H 2L H L.

Figure 17:
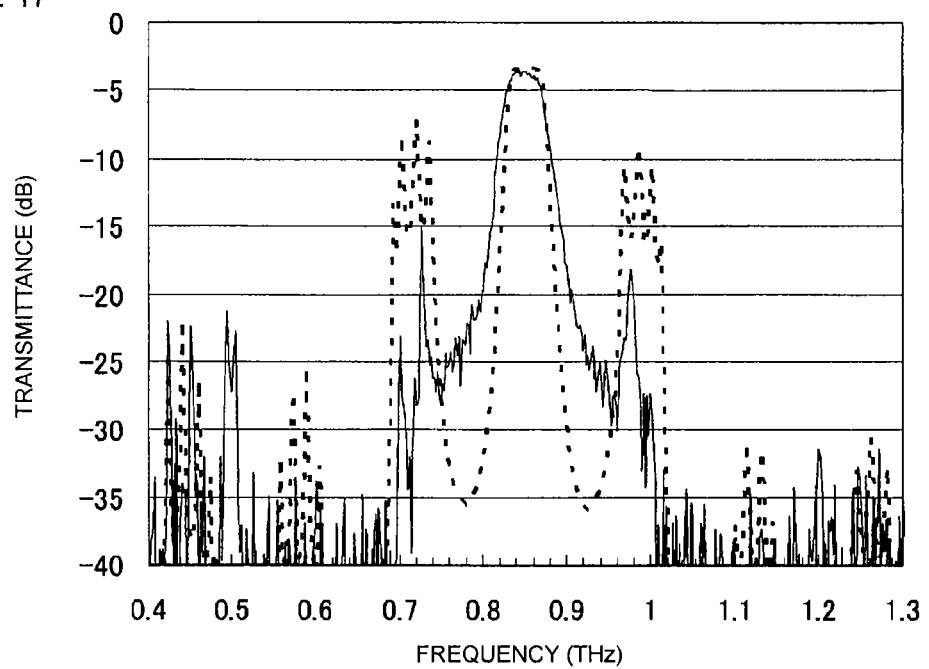
FIG. 17 illustrates the transmission spectrum of the terahertz band optical filter according to a seventh embodiment.

FIG. 17 illustrates the transmission spectrum when the design passband central wavelength $\lambda_O$ is set to 0.35 mm (0.85 THz). In FIG. 17, a solid line represents the characteristic of the filter according to the seventh embodiment. A broken line represents the characteristic of a filter having the structure of the sixth embodiment that does not include the second adjustment layers 56 and the coupling layer 54 for joining the second adjustment layers 56 together and that has a bandwidth the same as that of the filter of the seventh embodiment.

In the example shown by the broken line, strong spurious components appear on either side of the main transmission peak. However, the filter according to the seventh embodiment has an average passband transmittance of −3.6 dB, the −3 dB bandwidth for the center frequency is 5.9% (50.2 GHz), and an attenuation gain of −35 dB in the stopband.

As described above, by disposing the second adjustment layer 56 between the cavity layer 51 and the adjustment layer 55 having an optical path length of $\lambda_O/2$, the strong spurious component can be reduced even when the optical path length of the cavity is long ($n \geq 3$).

The number of layers (y) of the second adjustment layer can be adjusted in accordance with the optical path length n of the cavity layer 51 and the number N. After examining the optimum number of layers of the second adjustment layers 56 in the ranges of n and N applicable to a practical filter, the present inventor discovered that the range of $1 \leq y \leq 4$ can minimize the spurious effect. Therefore, when designing a filter, it is desirable that the number of layers of the second adjustment layer 56 is determined so as to be a value in this range.

Eighth Embodiment

A terahertz band optical filter according to an eighth embodiment is described next with reference to FIGS. 18 and 19.

The eighth embodiment provides a method for reducing a second-order intensity of the Fabry-Perot interference in the structures of the fifth to seventh embodiments.

Figure 18:
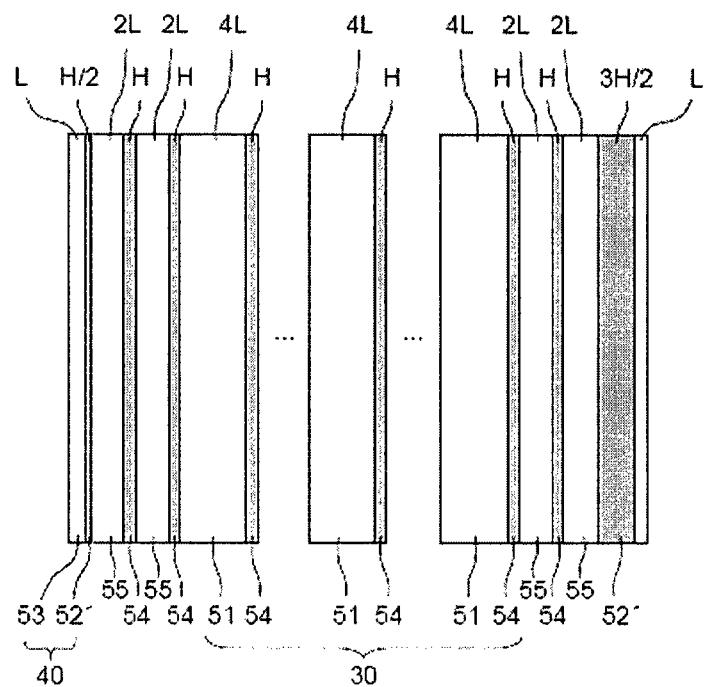
FIG. 18 is a cross-sectional view of a terahertz band optical filter according to an eighth embodiment.

FIG. 18 is a cross-sectional view of a terahertz band optical filter according to the eighth embodiment. FIG. 19 illustrates an example of the transmission spectrum of the filter.

In the eighth embodiment, the $\lambda_O/4$ high refractive index layers each disposed second from the end of the lamination structure of the fifth to seventh embodiment is replaced with high refractive index layers 52' formed from a high refractive index medium and having an optical path length of an integer multiple of $\lambda_O/8$.

As shown in FIG. 18, when N=4, n=2, and x=2, the structure is represented as follows:

L(H/2) 2L H 2L H 4L H 4L H 4L H 4L H 2L H 2L (3H/2)L.

This terahertz band optical filter is produced on the basis of the structure shown in the sixth embodiment and has 19 dielectric layers.

Figure 19:
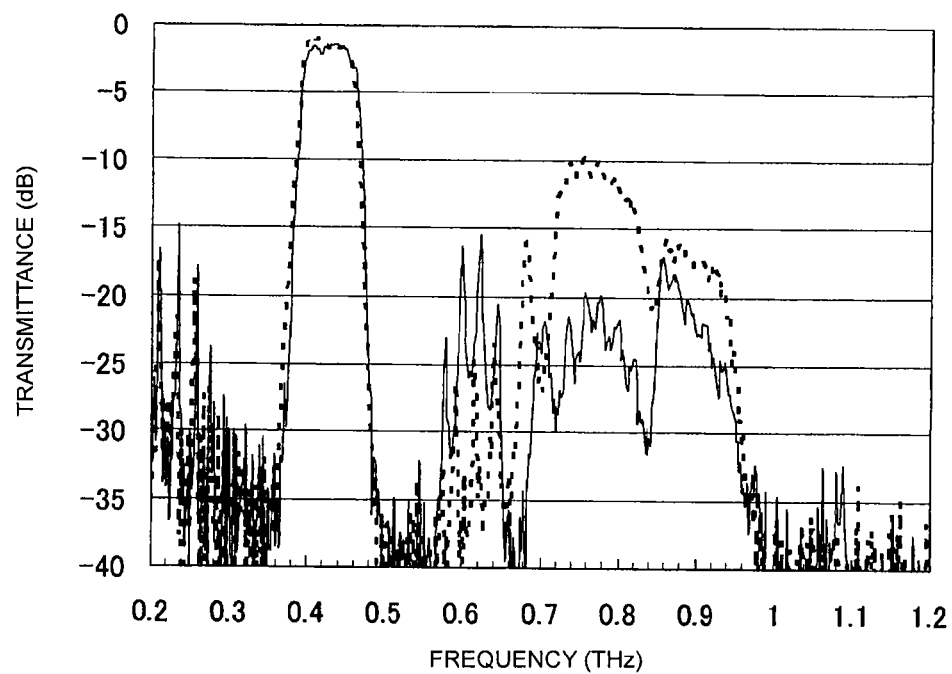
FIG. 19 illustrates the transmission spectrum of the terahertz band optical filter according to an eighth embodiment.

FIG. 19 illustrates the transmission spectrum when the design passband central wavelength $\lambda_O$ is set to 0.7 mm (0.43 THz), as in the sixth embodiment. In FIG. 19, a solid line represents the characteristic of the filter according to the eighth embodiment. A broken line represents the transmission spectrum of the sixth embodiment.

In the example shown by the broken line, the second-order Fabry-Perot component that reaches −10 dB appears on the high-frequency side of the main transmission peak. In contrast, in the filter according to the eighth embodiment, the second-order Fabry-Perot component is reduced to less than or equal to −17 dB. The characteristic values of the main transmission peak are an average passband transmittance of −1.8 dB, the −3 dB bandwidth for the center frequency of 16.6% (71.1 GHz), and an attenuation gain of −35 dB in the stopband. That is, the characteristics that are the same as those of the sixth embodiment can be obtained.

Ninth Embodiment

The ninth embodiment provides a method for controlling the bandwidth of a filter by, in particular, changing only the optical path length of the cavity layer in the structures of the first to eighth embodiments.

Figure 20:
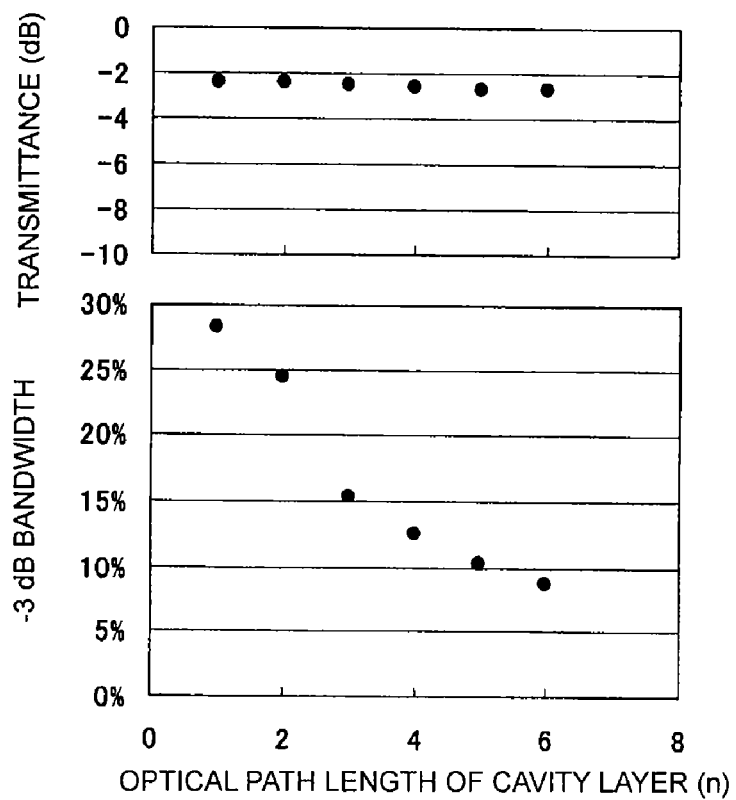
FIG. 20 illustrates changes in a −3 dB bandwidth and the transmittance when the optical path length n of a cavity layer of the terahertz band optical filter according to the sixth embodiment is changed.

FIG. 20 illustrates changes in a −3 dB bandwidth of the passband and the transmittance when N=3, x=2, and the optical path length n of the cavity is changed in the structure illustrated in the sixth embodiment. The design center wavelength is 0.6 mm (0.5 THz).

The bandwidth can be made smaller by increasing n. In the present embodiment, the bandwidth can be changed from about 9% to 28% of the center frequency.

At that time, the transmittance changes very little. The transmittance is about −2.5 dB in any case.

In this way, the bandwidth of the filter can be controlled within a predetermined range with the transmittance remaining unchanged.

Tenth Embodiment

A tenth embodiment provides a method for manufacturing the terahertz band optical filters according to the first to ninth embodiments.

The method for manufacturing the terahertz band optical filters is as follows:

(1) First, powders of each of the dielectric ceramic materials required for producing the terahertz band optical filters according to the first to ninth embodiments are mixed with a binder and are milled with a ball mill. Thereafter, the powders are formed into a ceramic raw sheet having a predetermined thickness.

(2) Subsequently, the ceramic raw sheets are stacked in the order in which the multi-cavity structure according to one of the first to ninth embodiments is formed. At that time, by appropriately changing the thicknesses and the numbers of the raw sheets, the thicknesses of the stacked sheets can be determined to predetermined values.

(3) The laminated body of the raw sheets is cut into a predetermined size and is fired into a sintered ceramic.

(4) At that time, by determining the thicknesses of the raw sheets while taking into account the contraction percentages of the sheets when the ceramics are fired, a laminated body having an accurate size can be obtained.

The above-described method can be performed by using existing industrial production equipment and production technology of dielectric multilayer substrates without any change. Accordingly, low-cost and high-productivity mass production of terahertz band optical filters is made possible without any extra equipment investment.

The invention claimed is:

1. A terahertz band optical filter having a bandpass characteristic in a terahertz band comprising:
   a dielectric multilayer periodic structure, the dielectric multilayer periodic structure including:
      at least two cavity layers, each cavity layer comprising a low refractive index medium and having an optical path length of an integer multiple of a ½ wavelength of a passband center frequency;
      a single-layer coupling layer located between each of the at least two cavity layers so as to form a multi-cavity structure, each coupling layer having an optical path length of a ¼ wavelength of the passband center frequency and comprising a high refractive index medium having a refractive index ratio of 2 or more with respect to the low refractive index medium; and
   matching layers disposed at either end of the multi-cavity structure, each matching layer including a layer of a high refractive index medium and a layer of a low refractive index medium, the matching layers having different dielectric constants, and each of the matching layers having an optical path length of an integer multiple of a ¼ wavelength of the passband center frequency.

2. The terahertz band optical filter according to claim 1, wherein the optical path length of the cavity layer is greater than or equal to one wavelength, and one or more adjustment layers having an optical path length of a ½ wavelength of a passband center frequency and comprising a low refractive index medium having a dielectric constant lower than that of the high refractive index medium of the matching layer and that of the coupling layer are disposed at either end of the multi-cavity structure between the cavity layer and the matching layer, and wherein the adjustment layers are coupled with a coupling layer therebetween, the coupling layer having an optical path length of a ¼ wavelength of a passband center frequency, and the coupling layer comprises a high refractive index medium having a dielectric constant higher than that of the adjustment layer.

3. The terahertz band optical filter according to claim 2, wherein the optical path length of the cavity layer is greater than or equal to a ³⁄₂ wavelength, and one or more second adjustment layers having an optical path length of one wavelength of a passband center frequency and comprising a low refractive index medium having a dielectric constant lower than that of the coupling layer are disposed between the cavity layer and the adjustment layer, and wherein the second adjustment layers are coupled with a second coupling layer therebetween, the second coupling layer having an optical path length of a ¼ wavelength of a passband center frequency, and the second coupling layer is formed from a high refractive index medium having a dielectric constant higher than that of the adjustment layer and that of the second adjustment layer.

4. The terahertz band optical filter according to claim 1, wherein the optical path length of the high refractive index medium of the matching layer is changeable to an integer multiple of a ⅛ wavelength of the passband center frequency.

5. A method for designing the terahertz band optical filter according to claim 1, the method comprising:
    determining the optical path length of the multi-cavity structure so as to determine the passband width.

6. A method for producing the terahertz band optical filter according to claim 1, the method comprising:
    forming a laminated structure by stacking dielectric ceramic raw sheets of at least two types having a refractive index ratio of 2 or more; and
    firing the laminated structure at one time so as to form the terahertz band optical filter.

* * * * *